United States Patent
Aili et al.

(10) Patent No.: US 11,393,475 B1
(45) Date of Patent: Jul. 19, 2022

(54) CONVERSATIONAL SYSTEM FOR RECOGNIZING, UNDERSTANDING, AND ACTING ON MULTIPLE INTENTS AND HYPOTHESES

(71) Applicant: Artificial Solutions Iberia SL, Barcelona (ES)

(72) Inventors: Eric Aili, Huddinge (SE); Ramazan Gurbuz, Uppsala (SE); Andreas Wieweg, Hägersten (SE)

(73) Assignee: ARTIFICIAL SOLUTIONS IBERIA S.L, Barcelona (ES)

( * ) Notice: Subject to any disclaimer, the term of this patent is extended or adjusted under 35 U.S.C. 154(b) by 0 days.

(21) Appl. No.: 17/148,335

(22) Filed: Jan. 13, 2021

(51) Int. Cl.
*G10L 15/18* (2013.01)
*G10L 15/22* (2006.01)

(52) U.S. Cl.
CPC .......... *G10L 15/22* (2013.01); *G10L 15/1815* (2013.01); *G10L 15/1822* (2013.01)

(58) Field of Classification Search
CPC . G10L 15/22; G10L 15/1815; G10L 15/1822; G10L 15/18
See application file for complete search history.

(56) References Cited

U.S. PATENT DOCUMENTS

| | | | |
|---|---|---|---|
| 10,216,832 B2 | 2/2019 | Bangalore et al. | |
| 10,713,441 B2 | 7/2020 | Sapugay et al. | |
| 10,990,767 B1* | 4/2021 | Smathers | G06F 16/322 |
| 2002/0194230 A1* | 12/2002 | Polanyi | G06F 40/289 707/E17.094 |
| 2010/0057463 A1* | 3/2010 | Weng | G06F 40/40 704/E15.001 |
| 2014/0067379 A1* | 3/2014 | Kim | G06F 40/232 704/9 |
| 2014/0330586 A1* | 11/2014 | Riskin | G16H 15/00 705/3 |
| 2015/0051900 A1* | 2/2015 | Kimelfeld | G06F 40/205 704/9 |
| 2015/0149182 A1* | 5/2015 | Kains | G10L 15/18 704/275 |

(Continued)

OTHER PUBLICATIONS

Kaplan, Ronald M., et al. "Speed and accuracy in shallow and deep stochastic parsing." Proceedings of the Human Language Technology Conference of the North American Chapter of the Association for Computational Linguistics: HLT-NAACL2004. (Year: 2004).*

(Continued)

*Primary Examiner* — Daniel C Washburn
*Assistant Examiner* — Oluwadamilola M Ogunbiyi
(74) *Attorney, Agent, or Firm* — Galvin Patent Law LLC; Brian R. Galvin

(57) ABSTRACT

A conversational system that recognizes, understands, and acts on multiple intents that may be explicit or implicit during conversations with humans. During a conversation, one or more utterances are received and processed through a plurality of machine learning algorithms to establish precise meanings, additional intentions, and alternative hypothesis. Using a combination of machine learning algorithms and datastores, conversations are interpreted as intended and may diverge where needed or desired, delivering a more useful, natural, and human-like dialogue between machines and people.

3 Claims, 11 Drawing Sheets

(56) References Cited

U.S. PATENT DOCUMENTS

| | | | | |
|---|---|---|---|---|
| 2015/0370787 | A1* | 12/2015 | Akbacak | G06F 40/47 704/2 |
| 2016/0055240 | A1* | 2/2016 | Tur | G06F 16/35 707/706 |
| 2016/0163311 | A1* | 6/2016 | Crook | G10L 15/065 704/275 |
| 2018/0315427 | A1* | 11/2018 | Kwon | G10L 15/22 |
| 2018/0330723 | A1* | 11/2018 | Acero | G10L 15/22 |
| 2019/0057316 | A1* | 2/2019 | Zhang | G06N 5/022 |
| 2019/0065627 | A1* | 2/2019 | De Mel | G06F 16/9535 |
| 2019/0182119 | A1* | 6/2019 | Ratkovic | H04L 43/045 |
| 2019/0228107 | A1* | 7/2019 | Trim | H04L 51/02 |
| 2019/0251104 | A1* | 8/2019 | Branavan | G06N 3/0445 |
| 2019/0251170 | A1* | 8/2019 | Chittimalli | G06N 5/025 |
| 2019/0325868 | A1* | 10/2019 | Lecue | G10L 15/22 |
| 2019/0362710 | A1* | 11/2019 | Yannam | G06F 17/16 |
| 2019/0371312 | A1* | 12/2019 | Naughton | G10L 15/22 |
| 2019/0378515 | A1* | 12/2019 | Kim | G10L 17/22 |
| 2019/0385611 | A1* | 12/2019 | Smythe | G06N 20/00 |
| 2020/0106896 | A1* | 4/2020 | Kondoh | G06F 3/167 |
| 2020/0159991 | A1* | 5/2020 | Chittari | H04L 51/02 |
| 2020/0202847 | A1* | 6/2020 | Mukherjee | G10L 15/22 |
| 2020/0293621 | A1* | 9/2020 | Ayers | G06F 40/35 |
| 2020/0311070 | A1 | 10/2020 | Yan et al. | |
| 2020/0335097 | A1* | 10/2020 | Seol | G10L 15/197 |
| 2020/0342874 | A1* | 10/2020 | Teserra | H04L 51/18 |
| 2020/0349940 | A1* | 11/2020 | Ko | G10L 15/22 |
| 2020/0349952 | A1* | 11/2020 | Lee | G10L 15/1822 |
| 2020/0372466 | A1* | 11/2020 | Bastide | G06Q 10/10 |
| 2020/0380389 | A1* | 12/2020 | Eldeeb | G06F 16/9535 |
| 2021/0004420 | A1* | 1/2021 | Mittal | G06F 16/9024 |
| 2021/0089616 | A1* | 3/2021 | Sizemore | G06F 40/205 |
| 2021/0312900 | A1* | 10/2021 | Lalithsena | G06Q 30/016 |

OTHER PUBLICATIONS

Collobert, R.. Deep Learning for Efficient Discriminative Parsing. Proceedings of the Fourteenth International Conference on Artificial Intelligence and Statistics in Proceedings of Machine Learning Research. 15:224-232 Available from https://proceedings.mlr.press/v15/collobert1. (Year: 2011).*

* cited by examiner

CONVERSATIONAL SYSTEM FOR RECOGNIZING, UNDERSTANDING, AND ACTING ON MULTIPLE INTENTS AND HYPOTHESES

CROSS-REFERENCE TO RELATED APPLICATIONS

None

BACKGROUND

Field of the Art

The disclosure relates to the field of virtual personal assistant software applications, and more particularly to the field of improving conversational interaction between users and a virtual assistant.

Discussion of the State of the Art

Conversational systems are computational systems that aim to communicate with their human interlocutors in the same way humans communicate among themselves. Systems of this type have been referred to as virtual assistants, intelligent assistants, digital assistants, personal assistants, dialog systems, chatbots, etc., and are built for many different purposes and embodied in many different forms (talking robots, talking wearables, website avatars, mobile apps, messaging apps, smart home devices etc.). However, the core methods underneath needed to achieve conversational interaction and the tasks to solve are the same, independent of the purpose and of the embodiment.

Currently, these systems are still far from achieving a conversational interaction and understanding in the way humans do. Conversational systems operate on the premise that humans provide an explicit intent and that the intent is phrased fairly simply with a small degree of freedom for word choice and order. However, humans making requests to one another naturally do not provide explicit step-by-step commands but assume a certain level of mutual understanding and knowledge from the other person. This is one of the main challenges to interpret the human interlocutor's input correctly and doing so by human dialogue alone may not convey enough information for a correct interpretation. Human discourse is at times ambiguous and fluid where what is said is not what is meant, and topics may shift on the fly. For conversational systems to truly interpret human intentions, it must recognize, prioritize, and incorporate multiple explicit and implicit intentions and be able to make accurate assumptions based off more than dialogue alone. Existing conversational systems lack this ability to a sufficient degree and is why modern human-to-computer conversations are disconnected, impersonal, and poorly interpreted.

What is needed, then, is a conversational system that recognizes, understands, and acts on multiple explicit and implicit intents for conversational applications.

SUMMARY

Accordingly, the inventor has conceived and reduced to practice, a system and method that recognizes, understands, and acts on multiple intents that may be explicit or implicit during conversations with humans. During a conversation, one or more utterances are received and processed through a plurality of methods—such as machine learning algorithms, semantic parsing, deep parsing, linguistic/rule-based algorithms—to establish precise meanings, additional intentions and alternative hypothesis. Using a combination of machine learning algorithms and datastores, conversations are interpreted as intended and may diverge where needed or desired, delivering a more useful, natural, and human-like dialogue between machines and people.

According to a preferred embodiment, a system for recognizing, understanding, and acting on multiple intents is disclosed, comprising: a computing device comprising a memory and a processor; a conversational system comprising a first plurality of programming instructions stored in the memory of, and operating on the processor of, the computing device, wherein the first plurality of programming instructions, when operating on the processor, causes the computing device to: receive a conversation comprising a plurality of utterances; send the plurality of utterances to an intent network; receive from the intent network a first plurality of intents; infer relationships among the first plurality of intents; generate a response using the unstated intent of the conversation; and the intent network comprising a second plurality of programming instructions stored in the memory of, and operating on the processor of, the computing device, wherein the second plurality of programming instructions, when operating on the processor, causes the computing device to: receive the plurality of utterances from the conversational system; extract the first plurality of intents from the plurality of utterances; send the first plurality of intents to the conversational system; receive the inferred relationships from the conversational system; intuit the second plurality of intents from the utterances based on the inferred relationships; and send the second plurality of intents to the conversational system.

According to another preferred embodiment, a method for recognizing, understanding, and acting on multiple intents is disclosed, comprising the steps of: receiving a conversation comprising a plurality of utterances; extracting a first plurality of intents from the plurality of utterances; inferring relationships among the first plurality of intents; intuit the second plurality of intents from the utterances based on the inferred relationships; generating a response using the unstated intent of the conversation.

According to various aspects of the invention; the intent network employs one or more of the following to determine intents: a machine learning algorithm, semantic parsing, deep parsing, and a rule-based algorithm; the conversational system is further configured to create, from the first plurality of intents, a knowledge graph comprising a plurality of intent nodes; the conversational system is further configured to create, from external data sources, a plurality of relevance nodes in the knowledge graph; the intent network is further configured to infer the second plurality of intents from the relationships between the plurality of intent nodes and the plurality of relevance nodes; the conversational system is further configured to generate a response to a plurality of unstated intents of the conversation; the system further comprising an alternative intent hypothesis generator comprising a third plurality of programming instructions stored in the memory of, and operating on the processor of, the computing device, wherein the third plurality of programming instructions, when operating on the processor, causes the computing device to determine an alternative hypothesis for the unstated intent of the conversation; the system further comprising an incongruity detector comprising a fourth plurality of programming instructions stored in the memory of, and operating on the processor of, the computing device, wherein the fourth plurality of programming instructions, when operating on the processor, causes the computing device to determine a most probable intent among a plurality of hypothesized intents.

According to additional various aspects of the invention; the method further comprising the step of employing one or more of the following to determine intents: a machine learning algorithm, semantic parsing, deep parsing, and a rule-based algorithm; the method further comprising the step of creating, from the first plurality of intents, a knowledge graph comprising a plurality of intent nodes; the method further comprising the step of creating, from external data sources, a plurality of relevance nodes in the knowledge graph; the method further comprising the step of inferring the second plurality of intents from the relationships between the plurality of intent nodes and the plurality of relevance nodes; the method further comprising the step of generating a response to a plurality of unstated intents of the conversation; the method further comprising the step of determining an alternative hypothesis for the unstated intent of the conversation; the method further comprising the step of determining a most probable intent among a plurality of hypothesized intents.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
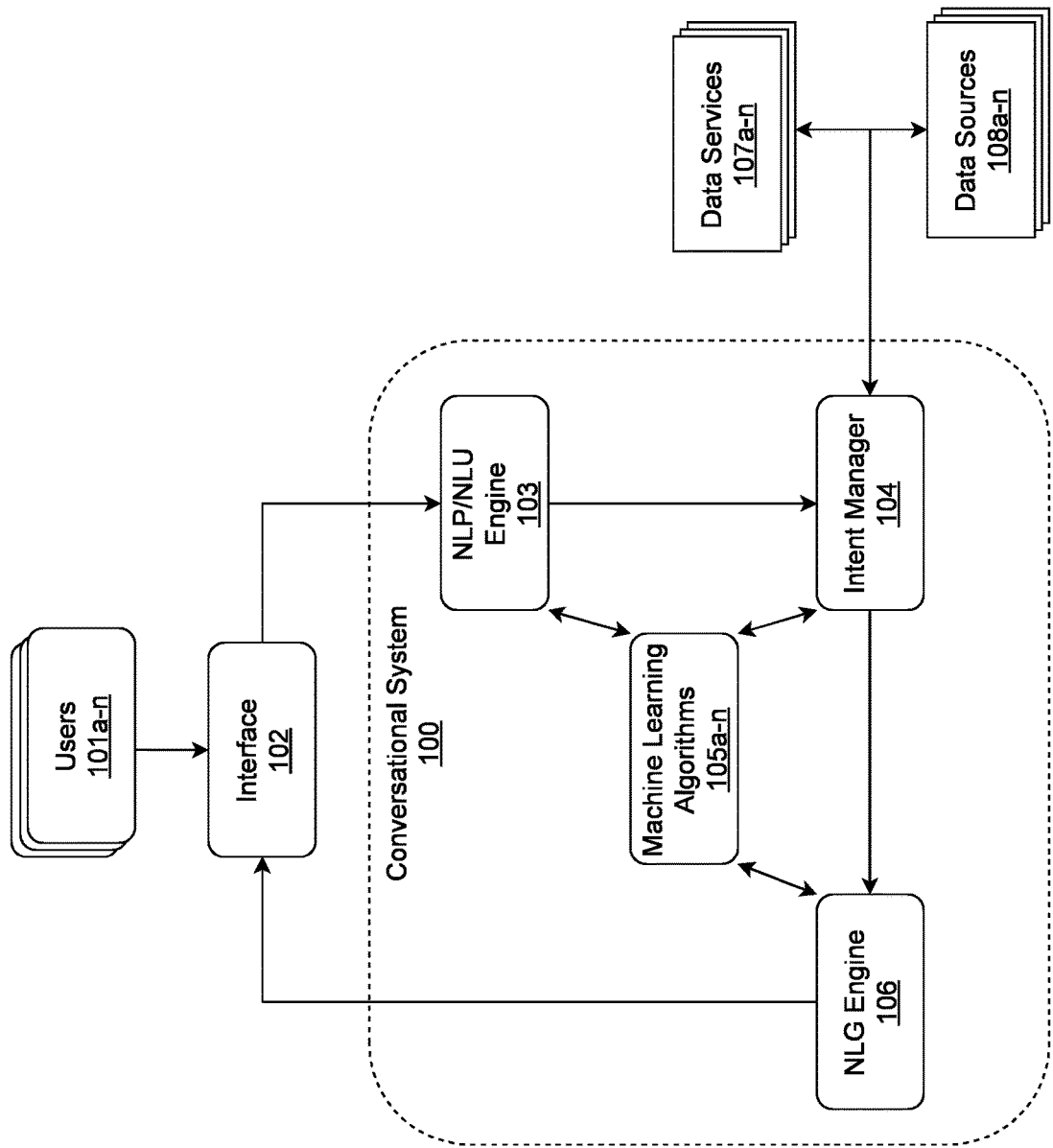
FIG. 1 is a block diagram illustrating a first exemplary system architecture for a conversational system for recognizing, understanding, and acting on multiple intents.

The inventor has conceived, and reduced to practice, a system and method that recognizes, understands, and acts on multiple intents that may be explicit or implicit during conversations with humans. During a conversation, one or more utterances are received and processed through a plurality of machine learning algorithms to establish precise meanings, additional intentions, and alternative hypothesis. Using a combination of machine learning algorithms and datastores, conversations are interpreted as intended and may diverge where needed or desired, delivering a more useful, natural, and human-like dialogue between machines and people.

According to one embodiment, user utterances, analog or digital in nature, are received and processed through three stages, each stage using one or more machine learning algorithms. The first stage is a natural language processing and understanding engine which parses the utterance for explicit and implicit intents. Utterances may be parsed more than once and in varying ways depending on one or more of the machine learning algorithms used. The second stage comprises an intent manager which tracks and prioritizes each intent. The machine learning algorithms used here infer relationships between intents, discover secondary or additional intents of which may be explicit or implicit. The intent manager may be used to keep a conversation toward a primary intent, tease out details of secondary intents, and build intent knowledge graphs from which other conversations may benefit. The knowledge graph stores intent trees which log the intents and all associated metadata from beginning to end of a conversation. Establishing a global persistent intent web of this nature provides predictive analysis and synthetic intents to formulate in the presence of intent ambiguity. Application programming interfaces (API) are utilized to integrate services and sources such as other knowledge bases, cloud-based services, data providers, inputs from Internet-of-Things (IoT) devices, and other means by which the conversational system performs its analysis. APIs may be used to output intents or other information identified by the conversational system either as single complex objects comprising intents and associated metadata or in the form of data streams containing multiple complex intent objects. The third and final stage of this embodiment comprises a natural language generation engine that receives one or more intents from the intent manager and formulates the response from the conversational system to the user.

According to an aspect of the embodiment, the global intent knowledge graph is a directed computational graph of intent trees where explicit and implicit intents are and mapped. Nodes in the graph may comprise data other than intents such as one or more keywords, voice inflection amplitudes, various sensor data, Internet data, and machine learning algorithms predictions and are referred to as relevance nodes. Relevance nodes represent personal relevance, social relevance, global relevance, short-term memory relevance, long-term memory relevance, and sensor data relevance. All intents are nodes, not all nodes are intents. Edges representing the strength of relevance between intent nodes and relevance nodes are calculated only for intent nodes, however should a relevance node share enough edges with a significant number of intent nodes, the number of which is adjustable, the conversational system may determine through inquiry, request, or an algorithm that the node is now an intention of the present conversation and covert it to an intent node. In simpler terms, if a conversation pivots towards a new topic, the conversational system will be able to follow the user's shift in intention.

Relevance is determined by the quantity and weight of edges that connect to other nodes in the knowledge graph. Each edge is weighted by temporospatial proximity. The more similar and recent the data, the heavier the edge and thus the higher the relevance. Multiple edges may join two nodes if they share multiple attributes, also increasing the relevance score. The priority of the node is determined by the numerical order of all intent nodes. A higher relevance has a higher priority than a lower relevance.

According to another embodiment, alternative hypothesis may be generated and tested using knowledge graphs based on user's utterances. Supplemented with evidence such as external data and sensors, user's utterances and the evidence may be matched and compared against profiles and templates stored in a database. An incongruity detector prunes away unlikely hypothesis in an iterative fashion leaving only the most probably intention of the user's utterance.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information.

"NLU" refers to natural language understanding, referring to the conversational approach utilized by the embodiments of the invention to receive and handle natural language within a hybrid system.

"Semantic Parsing" as used herein is the task of converting a natural language utterance to a machine-understandable representation of its meaning. Semantic parsing is used to extract the precise meaning from an utterance using shallow parsing and deep parsing. Shallow parsing chunks an utterance into separate noun, verb, and prepositional phrases. Deep parsing generates a tree of the shallow parsing chucks.

Conceptual Architecture

FIG. 1 is a block diagram illustrating an exemplary system architecture for a conversational system for recognizing, understanding, and acting on multiple intents.

According to this embodiment, a conversational system 100 receives utterances from one or more users 101a-n via a user interface 102 which may comprise chatbots, websites, mobile applications, email clients, voice enabled devices, or other communication platforms. A natural language processing and natural language understanding engine 103 parses the input and determines all possible initial explicit and implicit intents. Parsing of utterances may be deconstructed in a plurality of ways depending on the machine learning algorithms 105a-n employed by the embodiment. An intent manager 104 receives the initial intents from the NLP/NLU engine 103 and attempts to further disambiguate intents and uncover any underlying or related intents via machine learning algorithms 105a-n.

According to one embodiment, the machine learning algorithms 105a-n use a series of APIs to collect data from any pertinent services 107a-n or sources 108a-n such as cloud-based services, social-media integrations, and Internet-of-Things (IoT) devices in order to supplement decision-making algorithms and situational context. This may include GPS data from a mobile device, security systems, audio from a microphone, video feeds, or any other sensor data available to the conversational system 100. Additional APIs allow for data generated within the conversation system 100 to be output to other services, some examples comprise integrations with other conversational systems, cloud-based services, and data repositories 107a-n, 108a-n.

The intent manager 104 creates and continuously updates a queue of intents as the machine learning algorithms 105a-n iterate over the intentions and until each intent has been accurately established marked by a high confidence score. Established intents are prioritized and one or more of the highest priority intents are sent to the natural language generation engine 106 to generate a response. After a response has been generated it is sent to the one or more users 101a-n via the user interface 102. The users 101a-n then respond, and this iterative process continues until there are no more intents in the intent manager 104 or until terminated by the users 101a-n.

Figure 2:
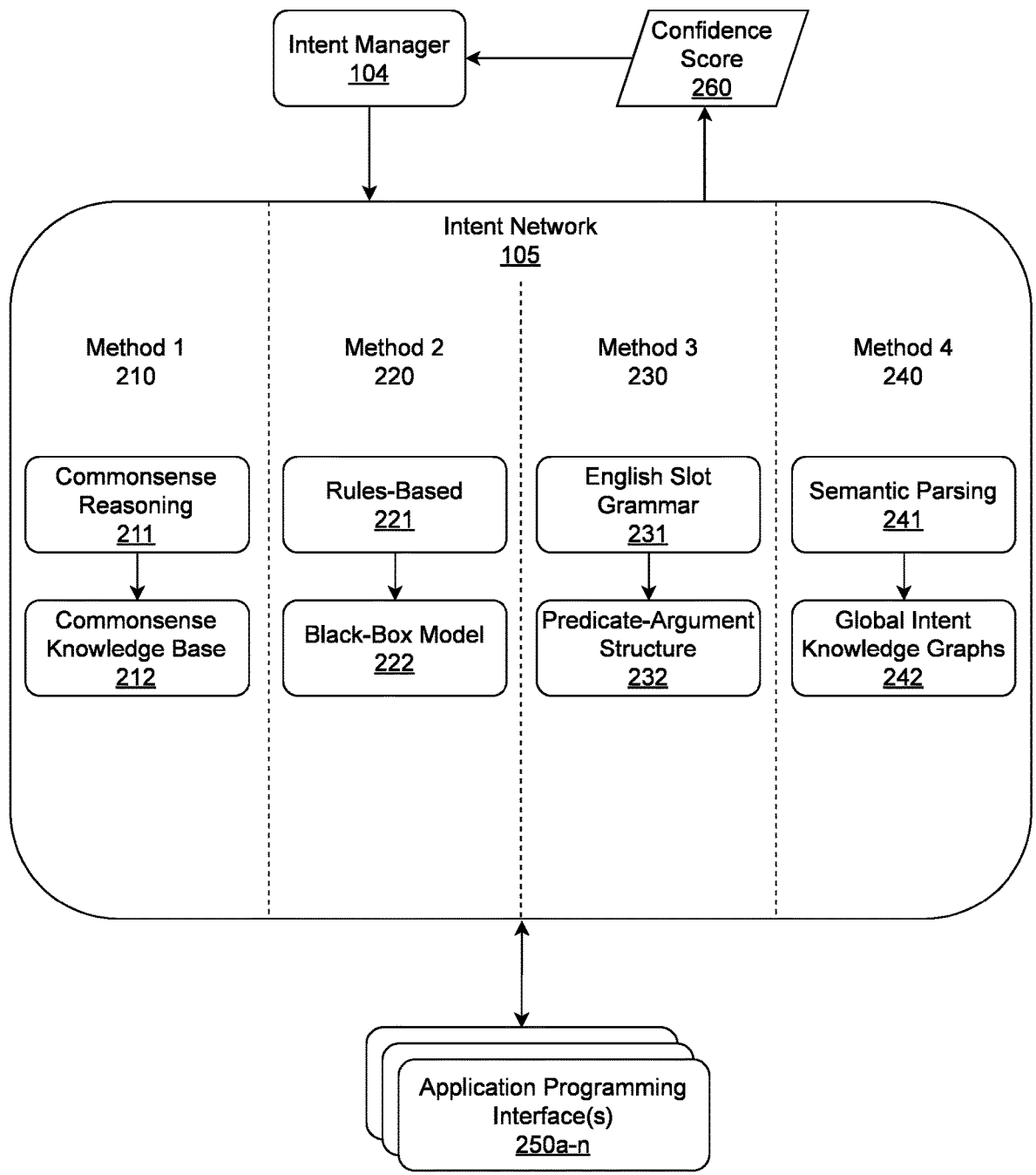
FIG. 2 is a block diagram of an exemplary system for determining multiple intents based on a plurality of machine learning methods.

FIG. 2 is a block diagram of an exemplary system for determining multiple intents based on a plurality of machine learning methods. This example uses a combination of machine learning methods but is not limited to these specific methods or limited by the number of, or combination of machine learning algorithms. The intent manager 104 stores a plurality of initial intents per each conversation with one or more users. Each method described herein may produce part of a confidence score 260 which allows the intent manager 104 to prioritize which intent is primary at the present moment during a conversation.

According to one embodiment, a first method 210 for recognizing, understanding, acting on multiple intents comprises commonsense reasoning 211 which is a branch of artificial intelligence that uses elaborate records to determine intents from an utterance. This method 210 is preferred for utterances with incomplete information, implicit statements, and commonplace presumptions made by humans. Utterances are compared against a commonsense knowledge base 212 which houses a datastore of language-independent relations. A few exemplary relations include CreatedBy ("cake" can be created by "baking"), SymbolOf (X represents Y), ReceivesAction ("cake" can be "eaten"), and HasFirstSubevent (The first thing required when doing X for entity Y is to do Z). Existing commonsense knowledge bases 212 may be accessed via APIs 250a-n or bespoke knowledge bases may be initialized within the conversation system itself. These databases may be updated manually or by machine learning algorithms as it learns over time.

According to one embodiment, a second method 220 for recognizing, understanding, acting on multiple intents uses a hybrid approach comprising linguistic/rules-based 221 algorithms and black-box/statistical machine learning modeling 222. Rules-based algorithms excel with simple explicit intents while black-box modeling is proficient when there are sufficient datasets available for training.

According to one embodiment, a third method 230 for recognizing, understanding, acting on multiple intents by deep parsing. Two deep parsing components, a English slot grammar parser 231 and a predicate argument structure (PAS) builder 232, provide linguistic analysis of utterances and context by way of parse trees. The English slot grammar parser 231 dissects a sentence or sentences into separate parse trees which contain both logical analysis (deep parsing) and grammatical analysis (shallow parsing) functions. The predicate argument structure (PAS) builder 232 simplifies each English slot grammar parse tree to the core semantic meaning. The PAS 232 achieves this by omitting nodes with auxiliary verbs, verb phrases, determiners, forms of be with no predicate and with adjective predicate. Each parse tree is scored by general rules such as preference of slots, rewards or penalties given in the lexicon, or trained data (by the slot grammar parser itself) of large corpora. The conversational system will then use only the highest ranked parse trees to formulate intents or responses.

According to one embodiment, a fourth method 240 for recognizing, understanding, acting on multiple intents by parsing utterances (by any choice of semantic parsing 241) and keeping a persistent global state of intent trees within a knowledge graph 242. These intent trees contain the sequence of intents from a conversation. Conversations from multiple entities and sources may be combined to form a global network of intent trees leading to highly predictive responses and intents. For example, by performing statistical analysis over a large set of common intent trees such as a request for information about a medical symptom, the conversational system may observe that such a query frequently precedes a following inquiry for treatment options.

According to one aspect of the embodiment, the intent manager 104 is configured to output a complex intent object to be used by other systems or databases. Flows of these complex intent objects may stream to devices or other systems where they may be implemented in various ways. For example, if this conversational system was employed as a technical question chatbot, the intents from conversations with customers or employees may be used to discover network congestion or malicious attacks. Intent objects may include intent trees, metadata, voice samples, and other data associated with each intent.

Figure 3:
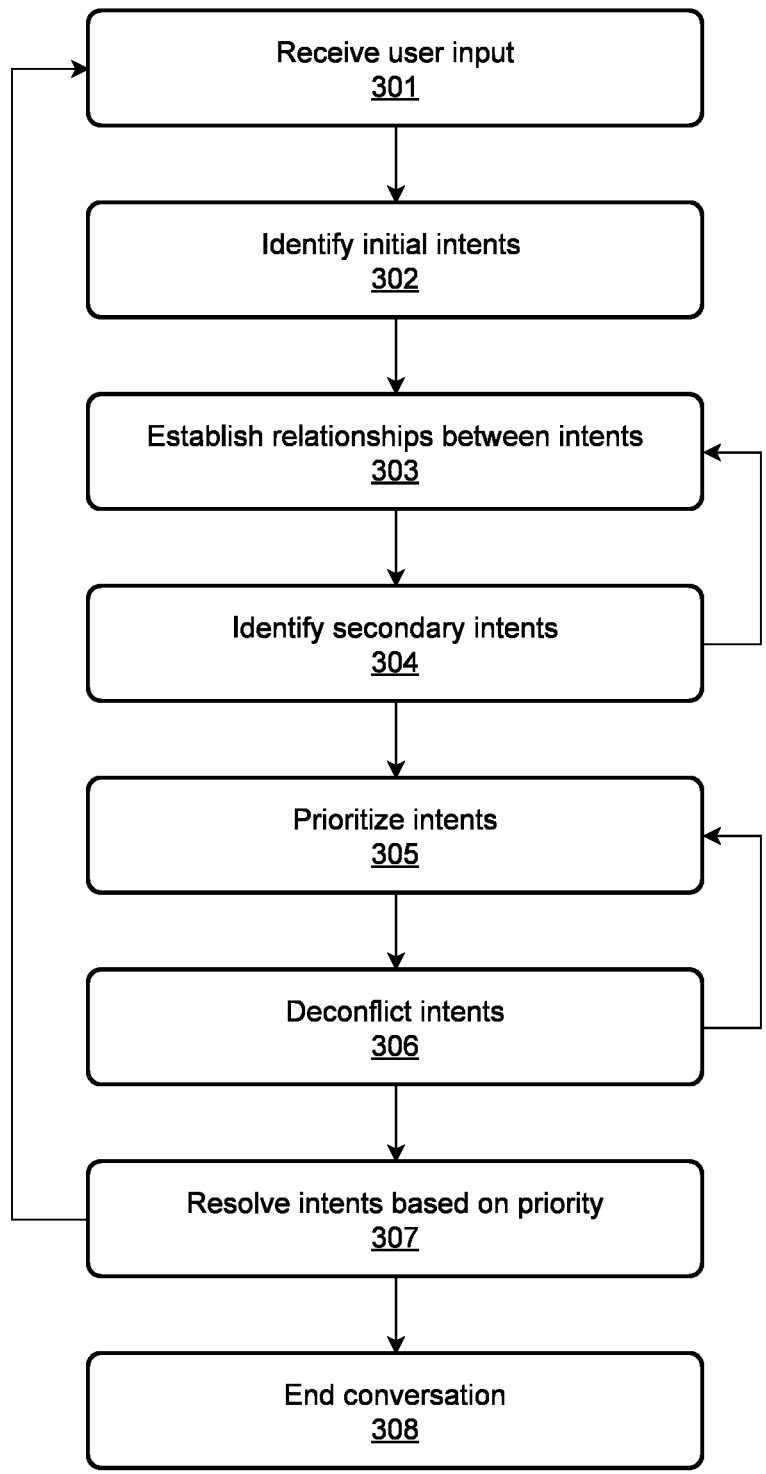
FIG. 3 is a flow diagram illustrating an exemplary method for recognizing, understanding, and acting up multiple intents, according to one aspect.

FIG. 3 is a flow diagram illustrating an exemplary method for recognizing, understanding, and acting up multiple intents, according to one aspect. At an initial step 301, user input in the form of an analog or digital signal is received by a natural language processing and understanding engine. One or more machine learning parsing algorithms may be utilized to analyze the input for initial explicit and implicit intents 302. Initial intents are then processed through one or more machine learning algorithms to establish underlying relationships 303 thus providing more accurate measure of the user's intentions. Secondary intents 304 that may have been undeclared or more complex implicit intentions are uncovered via a plurality of machine learning algorithms as explained in FIG. 2. Any new or altered intents trigger an iteration of relationship mapping so as to thoroughly exhaust all intrinsic meaning in the user's input.

The intent manager continuously updates a queue of intents and their relevance to the present conversation (user's input) by assigning a priority to each intent 305. After the full analysis of the user's input, any ambiguity in the user's request or additional information needed to fulfill the user's request may be presented to the user for deconfliction 306. Additional information provided by the user triggers a rapid recalculation of priority so as to fill any gaps in request. This is exemplified in slot grammar parsing. Resolved intents in the queue make way for the next highest priority intent 307 and this iterates until the queue is empty or until the user ends the conversation 308.

Figure 5:
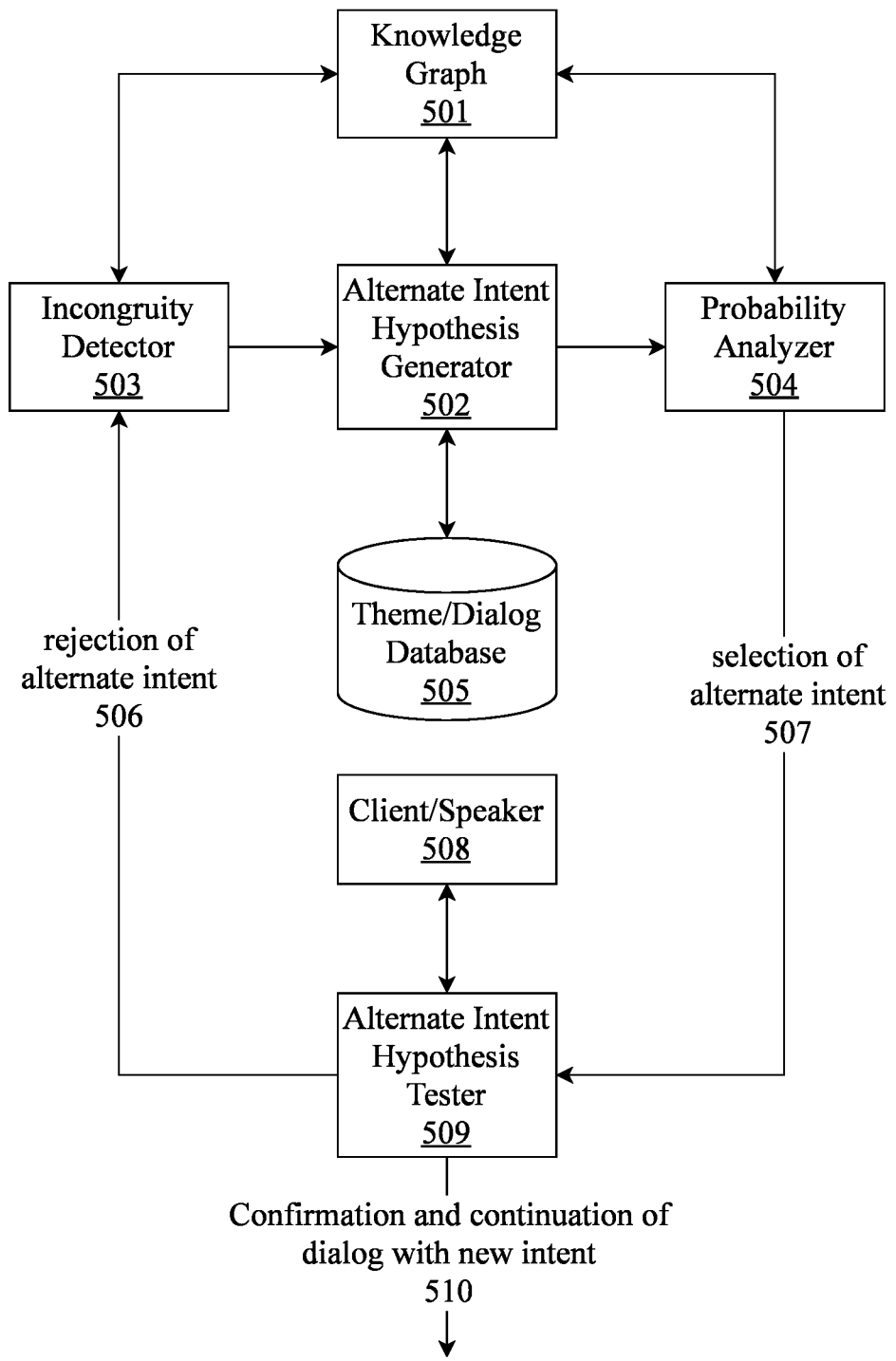
FIG. 5 is a block diagram illustrating a second exemplary system architecture for a conversational system for recognizing, understanding, and acting on multiple intents.

FIG. 5 is a block diagram illustrating a second exemplary system architecture for a conversational system for recognizing, understanding, and acting on multiple intents. Given an utterance from a client/speaker 508, an alternate intent hypothesis generator 502 compares the utterance with common themes and dialogs stored in a database 505 in order to identify potential alternative intents. The utterance and any potential intents are mapped to a knowledge graph 501 along with any secondary data points such as themes, previous dialogs, or sensor data. For example, military intelligence analysts typically comb through mountains of evidence manually to find patterns of behavior and intentions. Using this embodiment, an analyst can process a series of interviews and time-series data evidence (collected via surreptitious data loggers) from suspected targets against interrogations and data evidence gathered from known targets. Nodes from this example may comprise names, dates, and places from utterances; sensor data such as GPS locations, facial recognition identifications, voice pattern recognitions; and intentions such as acts of terrorism, enemy logistics, or enemy organizational mission statements.

Once an initial knowledge graph 501 is established, a probability analyzer 504 determines the most likely intention 507 and sends it to an alternate intent hypothesis tester 509 which confirms or rejects the intent based on feedback from the client/speaker 508. If the intent is not accepted 506, an incongruity detector 503 analyzes the knowledge graph and generates new nodes or edges in the knowledge graph 501. The process starting with the alternate intent hypothesis generator begins anew and this is repeated until the most accurate intentions are determined and the conversation continues 510.

According to another embodiment, an alternate intent hypothesis tester 509 may comprise a set of rule-based or machine learning algorithms to determine alternative intent validity opposed to confirmation via a human client/speaker 508.

Detailed Description of Exemplary Aspects

Figure 4:
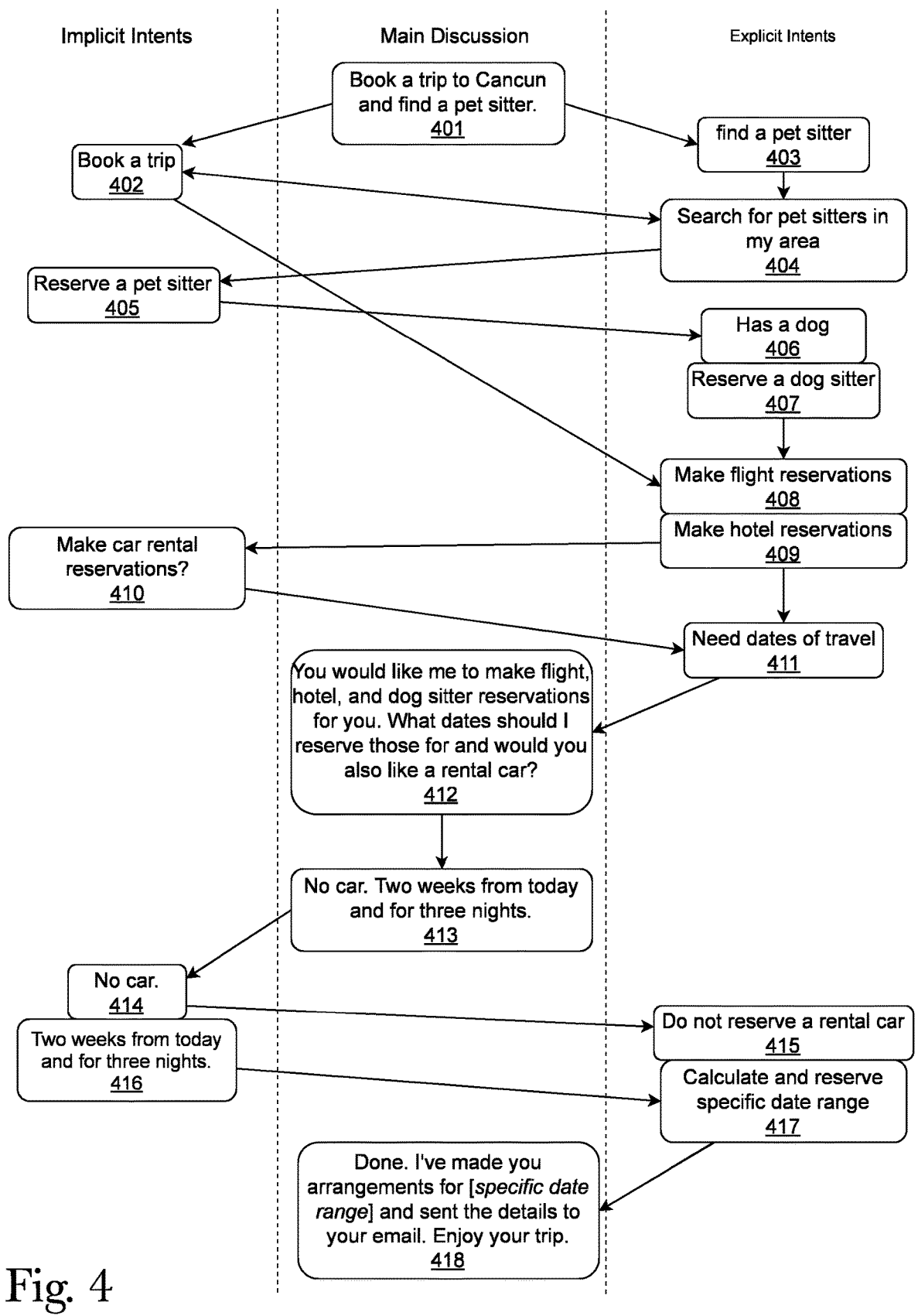
FIG. 4 is a flow diagram of an exemplary dialogue between a human and a conversational system used for recognizing, understanding, and acting up multiple intents.

FIG. 4 is a flow diagram of an exemplary dialogue between a human and a conversational system used for recognizing, understanding, and acting up multiple intents. In this example, a human interlocutor makes a request of "Book a trip to Cancun and find a pet sitter." 401 to a conversational system. Existing conversational systems may be able to handle at least the first 402 of these intents, however the ambiguity of the word book causes modern conversational systems to ask for clarification. Should an existing conversational system respond to the second request of "find a pet sitter" 403 it would not do so in the context of both intents and produce an incorrect response 404.

According to one embodiment of the inventor's conversational system, machine learning algorithms track all intents within a conversation and infer, prioritize, and score relations between intents. Using one or more of the machine learning algorithms disclosed in FIG. 2, but not limited to, the conversational system will deconflict any ambiguity of an intent before responding to the user thus providing the means to draw proper intent from each user request. For example, while "find a pet sitter" 403 is easily understood by any conventional conversational system to return search results for pet sitters in the user's area 404, the system disclosed herein understands there is a higher probability the user wants to reserve a pet sitter 405 for the same duration as the trip to Cancun (understood after the deconfliction of "Book a trip" 402). Further details may be inferred if social media profiles, previous Internet searches, and other data sources are considered for context analysis. Such as knowing the user has a dog 406 from a social media profile or multiple Internet orders for dog food. Depending on the confidence score of that information, the conversational system may find a reservation for a dog sitter 407 by ensuring the keyword dog is in the pet sitters' profile or website.

At the same time the conversational system is processing the explicit intent 403, the implicit intent is processed in the same manner. Using machine learning algorithms, the ambiguity of "Book a trip" 402 is established to have a high probability of the intent to reserve a flight 408 and hotel 409 for the requested destination. Commonsense reasoning and global intent knowledge graphs lend themselves particularly well in this scenario. After each deconfliction of an intent, all intent relations are recalculated and reprioritized.

Global intent knowledge graphs may also intuit new intents. For example, if intent trees in the knowledge graph begin with making flight and hotel reservations and typically lead to making car rental reservations, then the conversational system will use that information to intuit a new intent of "Make car rental reservations?" 410. Furthermore, slot grammar techniques may be used to fulfill requests such as making reservations by asking follow-up questions 412 as in needing the dates of travel 411 from the user.

Once the conversational system and deconflicted all intents, prioritized the intents, it formulates a response to continue the conversation 412 and elicit any needed information. Should the user give the conversational system multiple implicit intents such as context-dependent sentence fragments, persistent intent trees in the global intent knowledge graph allow inverse tree traversal to determine context for the response. For example, "No car." 414 and "Two weeks from today and for three nights." 416 may be disambiguated from the response 413, first by one or more of the machine learning algorithms (a good candidate being method 2 or method 3 from FIG. 2), then linked to previous intents in the conversation, allowing the conversation system to determine no rental car reservation 415 is necessary and to compute the date range 417 for the user's trip. Upon resolution of all intentions, the conversational system may end the dialogue with confirmation and a closing statement 418.

Figure 6:
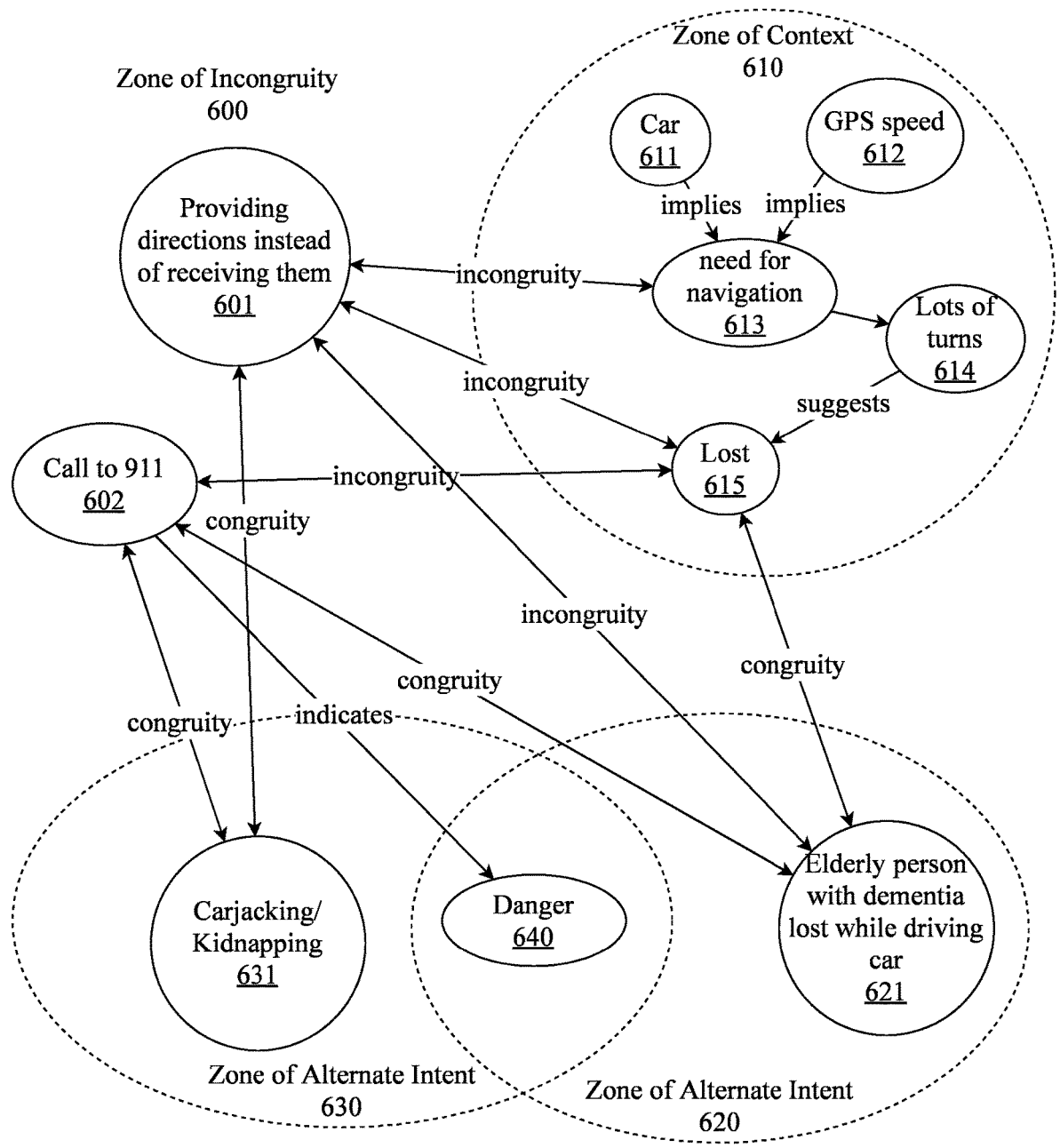
FIG. 6 is a diagram of an exemplary knowledge graph used by a conversational system for recognizing, understanding, and acting on multiple intents.

FIG. 6 is a diagram of an exemplary knowledge graph used by a conversational system for recognizing, understanding, and acting on multiple intents. This diagram illustrates a knowledge graph comprising at least three distinct zones from which multiple intents may be determined. In this example, a person has been carjacked and is still in the vehicle with the carjacker. The caller covertly dials 911 602 and leaves the phone where the carjacker cannot see or hear it and begins to ask the driver why he or she is driving past certain landmarks, or in a cardinal direction, or down a specific street 601. The 911 dispatcher is unaware of the caller's intentions, however is employing the system disclosed herein, where the call is being analyzed in real-time.

The caller's utterances are streamed, parsed, and mapped to the knowledge graph in the zone of incongruity 600 where nodes of utterances and behaviors established from the streaming phone call reside. The comparison of dialog templates in a theme/dialog database allows the alternative intent hypothesis generator to make inferences of alternative intents such as a possible carjacking/kidnapping 631 or an elderly person with dementia lost while driving 621.

A zone of context 610 maps out any sensor data that is available. For this example, the caller's mobile device is used to get GPS coordinates 612, 614 and background audio cues infer the caller is in a vehicle 611. An alternate intent hypothesis generator assists in the determination of alternative intents within the zone of context, creating the implied node need for navigation 613 and suggested node Lost 615. However, the incongruity detector determines that both the previous intentions 613, 615 are incongruent based on the dialog template and present conversation. The incongruity detector also processes any other alternative hypothesis such as the elderly person with dementia lost while driving 621 but as in this example, finds that to be incongruent as well.

With the only remaining alternative intent being carjacking/kidnapping 631, the intent 631 is sent to the dispatcher along with an alert for the indication of danger 640 inferred from the cross-section of alternative intent zones 620, 630.

Figure 7:
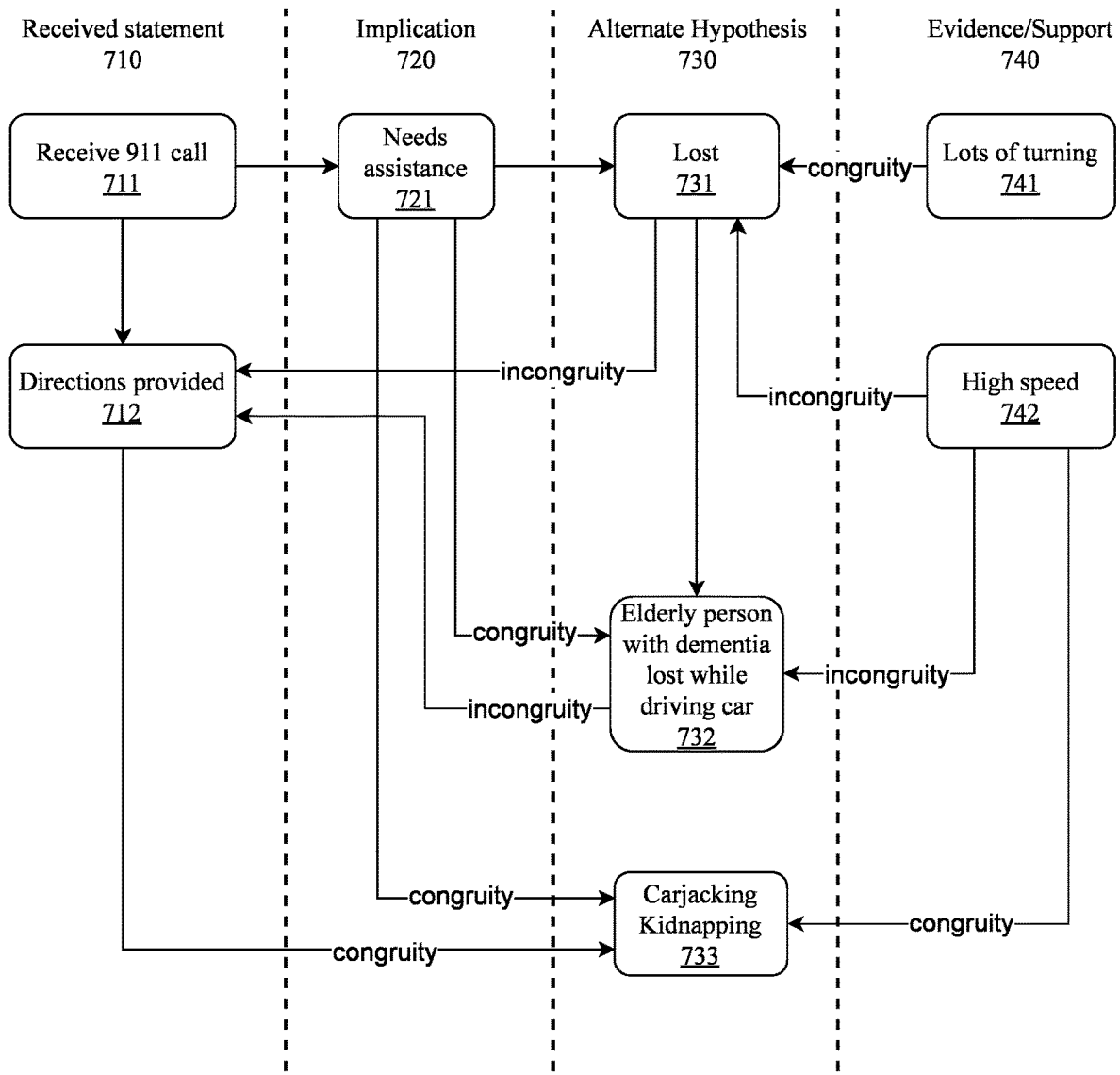
FIG. 7 is a block diagram showing a logical decision-making process of conversational system for the recognition, understanding, and acting on multiple intents and hypothesis.

FIG. 7 is a block diagram showing a logical decision-making process of conversational system for the recognition, understanding, and acting on multiple intents and hypothesis. According to one embodiment, conversational phrases and meanings may be classified into four categories: received statements 710, implications 720, alternate hypothesis 730, and evidence/support 740. Initial received statements such as the example of the 911 call 711, provide implications of a person needing assistance 721. An initial hypothesis is generated that the caller is lost 731 but further consideration of received statements 710 of the caller providing directions 712, coupled with circumstantial evidence of lots of turning 741 and sustained high speeds 742, a second 732 and third 733 hypothesis is inferred. Incongruity detectors prune away hypothesis and leave the most congruent hypothesis 733 to be confirmed by the user.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
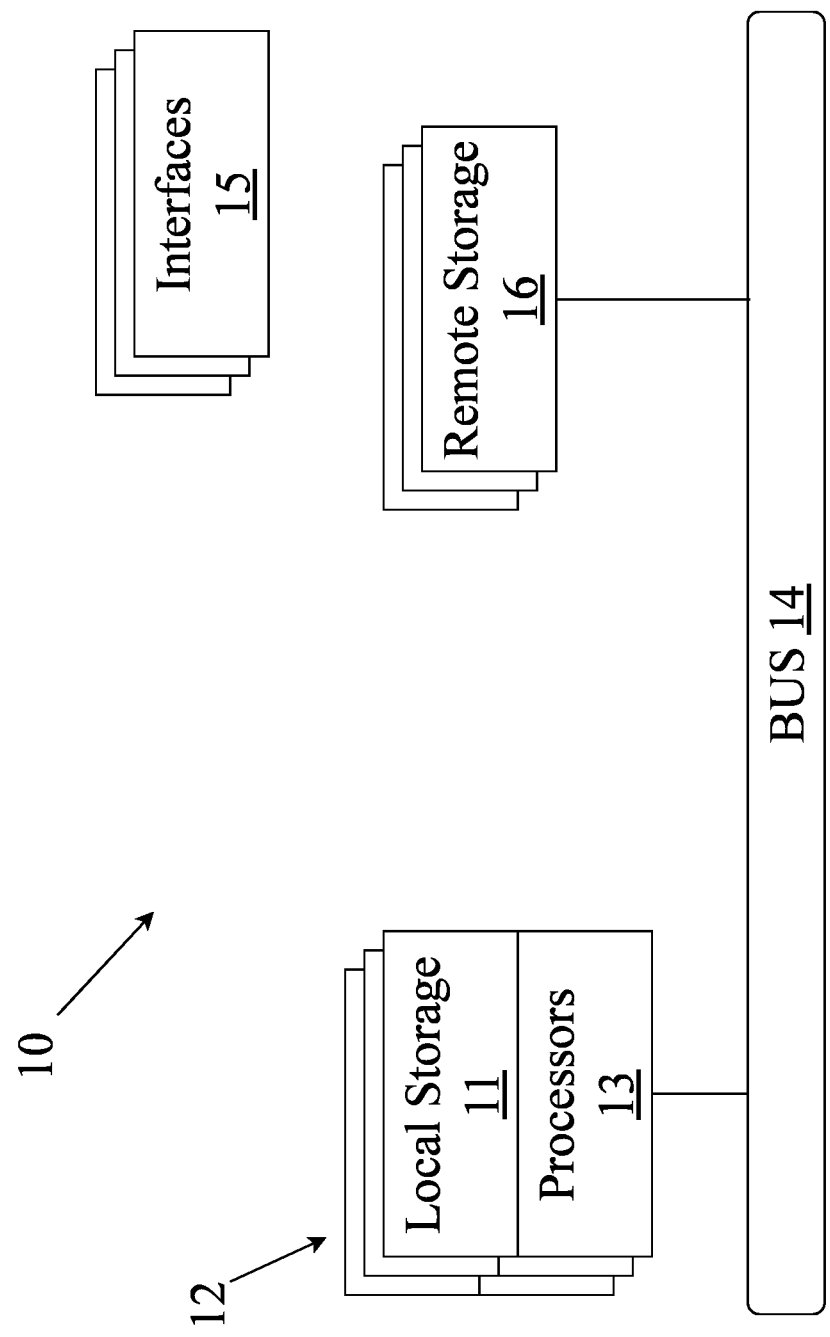
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
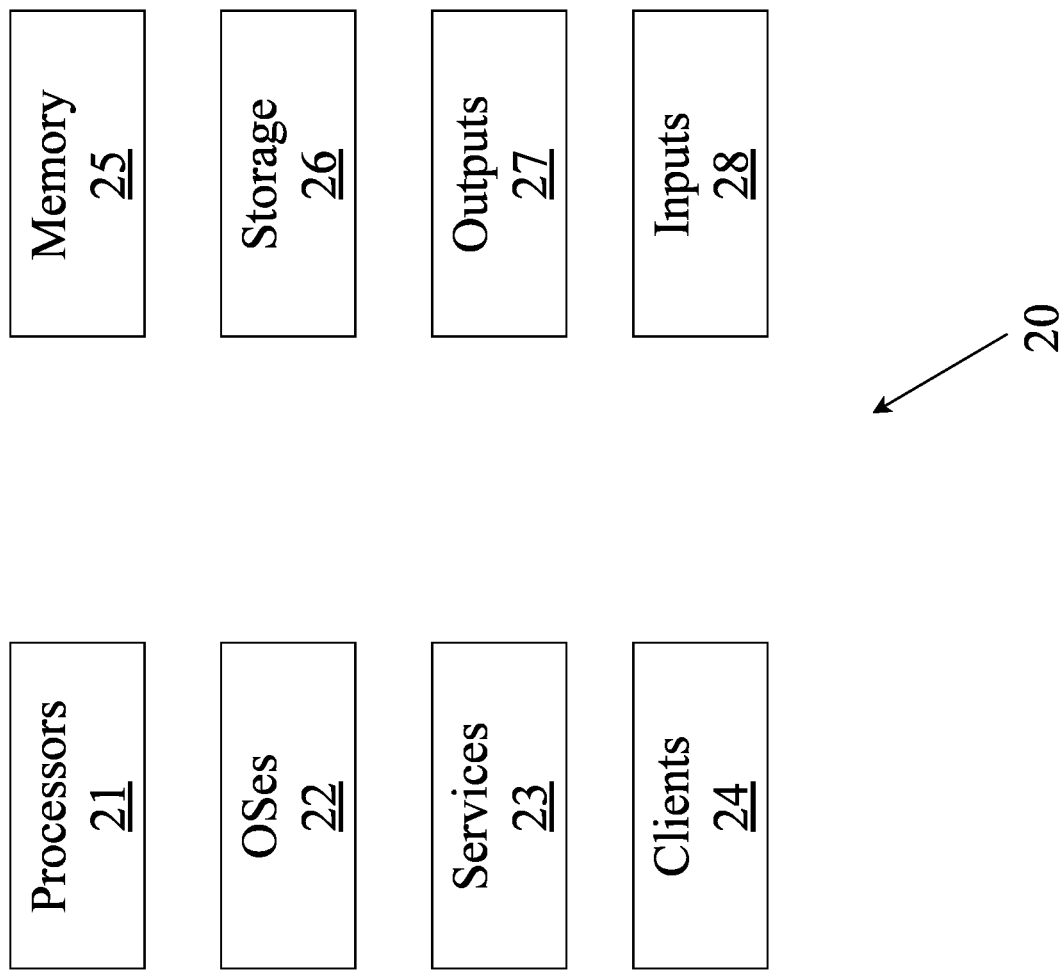
FIG. 9 is a block diagram illustrating an exemplary logical architecture for a client device.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
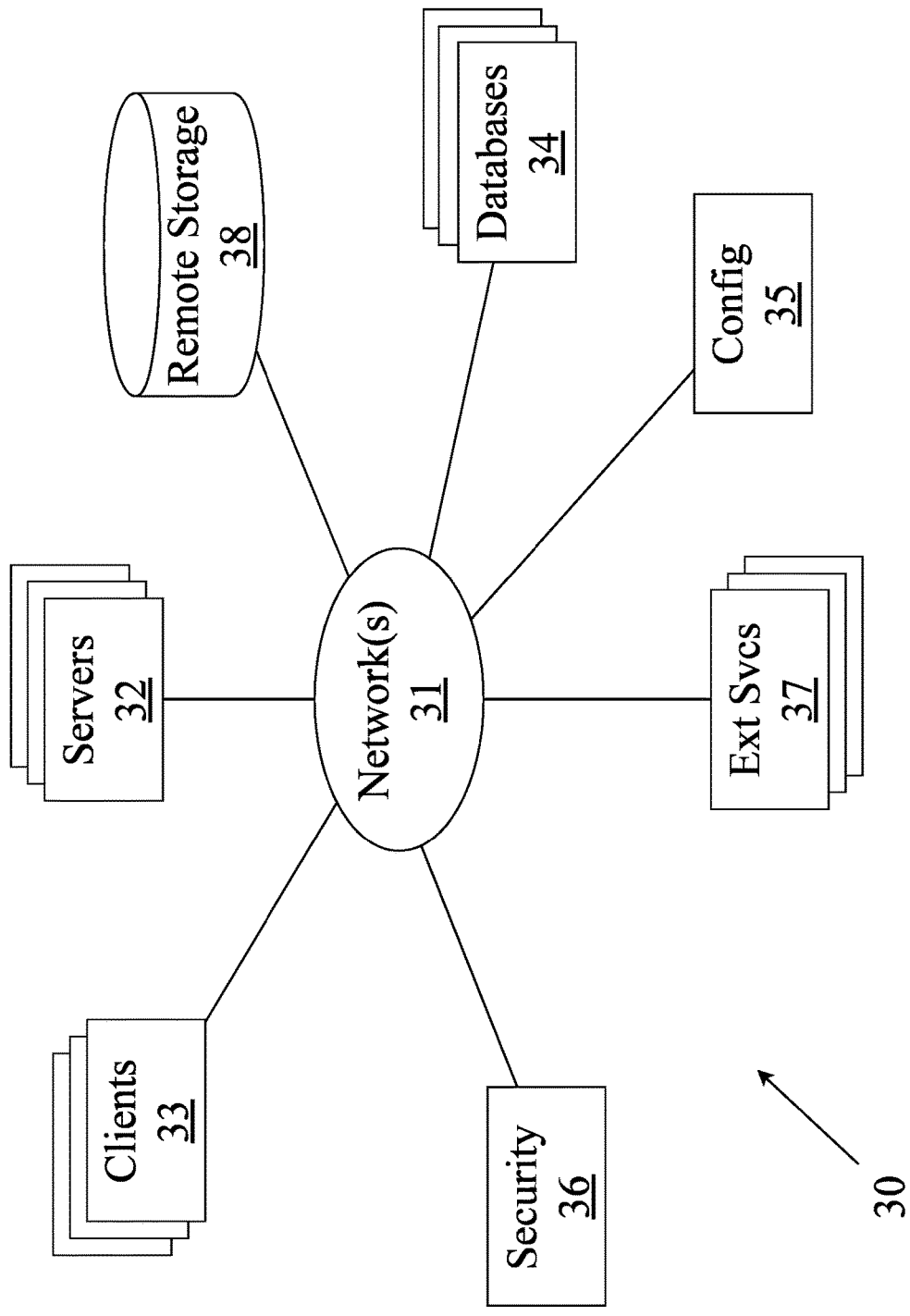
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
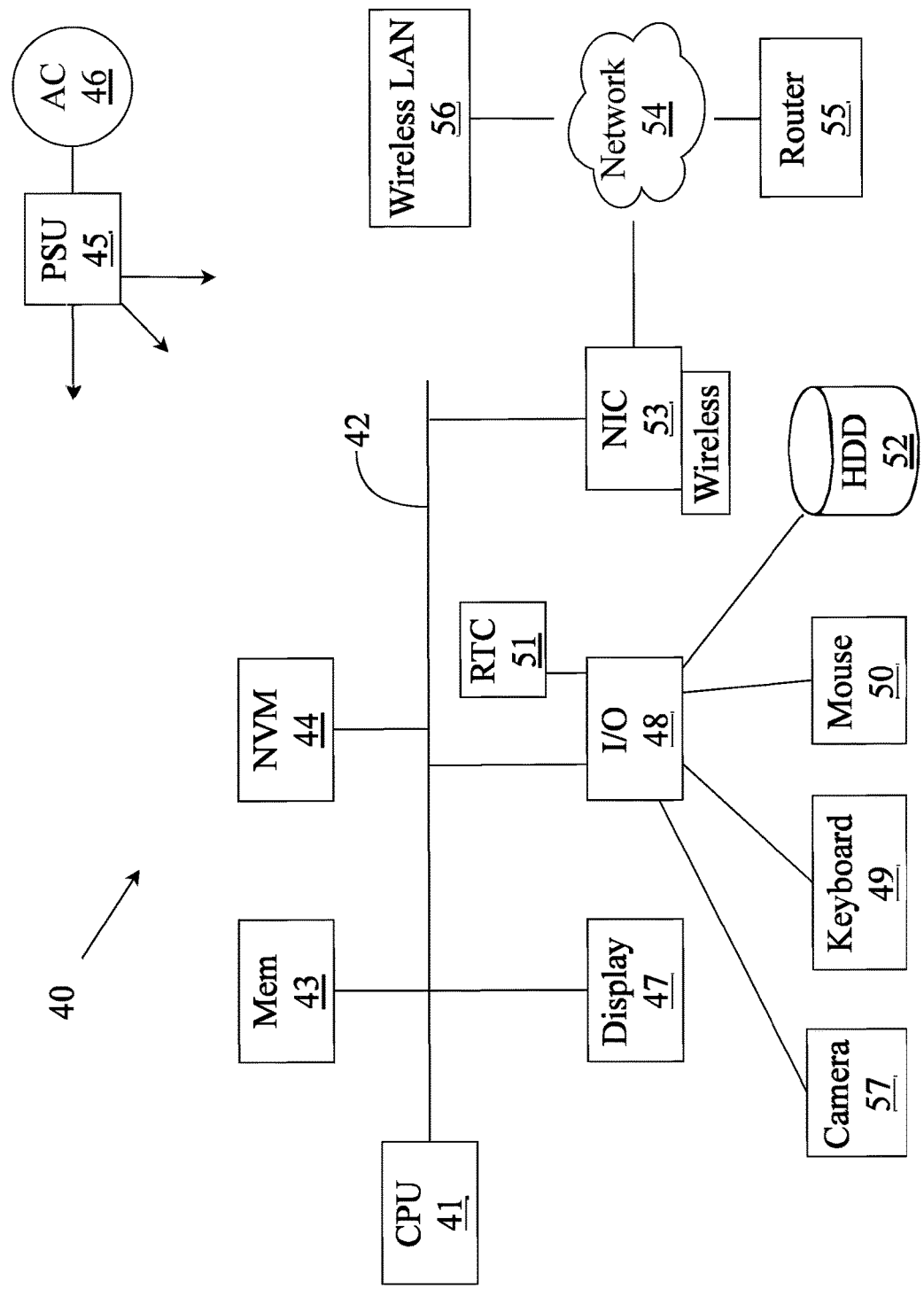
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for recognizing, understanding, and acting on multiple intents, comprising:

a computing device comprising a memory and a processor;

a persistent global intent knowledge graph, wherein the persistent global intent knowledge graph is a directed computational graph of intent trees;

a slot grammar parser comprising a first plurality of programming instructions stored in the memory of, and operating on the processor of, the computing device, wherein the first plurality of programming instructions, when operating on the processor, causes the computing device to:

receive an utterance;

perform deep parsing on the utterance to generate a first parse tree, wherein the first parse tree comprises a logical analysis of the utterance; and perform shallow parsing on the utterance to generate a second parse tree, wherein the second parse tree comprises a grammatical analysis of the utterance; and a predicate argument structure builder comprising a second plurality of programming instructions stored in the memory of, and operating on the processor of, the computing device, wherein the second plurality of programming instructions, when operating on the processor, causes the computing device to:

collapse the first and second parse trees into a plurality of possible core semantic intents;

populate a node in the persistent global intent knowledge graph for each intent in the plurality of possible core semantic intents;

determine a most likely intent by ranking each intent in the plurality of possible core semantic intents and selecting the top ranked intent; and generate a response using natural language processing and the top ranked intent.

2. A method for recognizing, understanding, and acting on multiple intents, comprising the steps of:

receiving an utterance;

performing deep parsing on the utterance to generate a first parse tree, wherein the first parse tree comprises a logical analysis of the utterance;

performing shallow parsing on the utterance to generate a second parse tree, wherein the second parse tree comprises a grammatical analysis of the utterance;

collapsing the first and second parse trees into a plurality of possible core semantic intents;

populating a node in a persistent global intent knowledge graph for each intent in the plurality of possible core semantic intents;

determining a most likely intent by ranking each intent in the plurality of possible core semantic intents and selecting the top ranked intent; and generating a response using the top ranked intent.

3. The method of claim 2, further comprising the step of creating, from external data sources and sensors, a plurality of relevance nodes in the knowledge graph.

* * * * *